United States Patent [19]

Birkheuer et al.

[11] Patent Number: 4,781,284

[45] Date of Patent: Nov. 1, 1988

[54] CLEANING OF A DRUM

[75] Inventors: Horst Birkheuer; Rudolf Fauerbach, both of Hilden; Dieter Hinrichsen, Duesseldorf, all of Fed. Rep. of Germany

[73] Assignee: Mannesmann AG, Duesseldorf, Fed. Rep. of Germany

[21] Appl. No.: 863,951

[22] Filed: May 16, 1986

[30] Foreign Application Priority Data

May 17, 1985 [DE]  Fed. Rep. of Germany ....... 3517782

[51] Int. Cl.$^4$ ............................................. B65G 45/00
[52] U.S. Cl. ..................................... 198/497; 198/580; 198/499
[58] Field of Search ................ 198/497, 499, 580, 741, 198/742; 474/92; 15/256.51

[56] References Cited

U.S. PATENT DOCUMENTS

| 1,199,580 | 9/1916 | Lowden | 198/741 |
|---|---|---|---|
| 1,779,686 | 10/1930 | Alver | 198/497 |
| 2,412,554 | 12/1946 | Armington | 198/497 |
| 2,906,396 | 9/1959 | Krauss et al. | 198/497 |
| 3,065,844 | 11/1962 | Mildh | 198/742 |
| 3,140,776 | 7/1964 | Carver | 198/741 |
| 3,377,645 | 4/1968 | Dapses | 15/256.51 |
| 3,809,211 | 5/1974 | Padilla | 198/580 |
| 4,390,268 | 6/1983 | Furuichi et al. | 15/256.51 |
| 4,598,823 | 7/1986 | Swinderman | 198/497 |

FOREIGN PATENT DOCUMENTS

| 850690 | 10/1960 | United Kingdom | 198/497 |
|---|---|---|---|
| 873418 | 7/1961 | United Kingdom | 198/497 |

Primary Examiner—Randolph A. Reese
Assistant Examiner—Anthony Knight
Attorney, Agent, or Firm—Ralf H. Siegemund

[57] ABSTRACT

A cleaning device for a drum being partially looped around by a conveyor belt having an upper and a lower stringer, the cleaning device being arranged in between the upper and lower stringers and comprises a plurality of strippers disposed for abutting the drum; a hydraulic cylinder mounts said strippers and a piston rod mounts carrying a piston, mounts the hydraulic cylinder which reciprocates on the piston; a plurality of downwardly extending soil shifting plates are mounted on the cylinder and move therewith; a dirt catching trough is pivotally mounted underneath the cylinder and stripping bars extend across an open surface of the trough and being in engagement with the soil pushing plates for cleaning these plates upon pivoting of the trough.

8 Claims, 3 Drawing Sheets

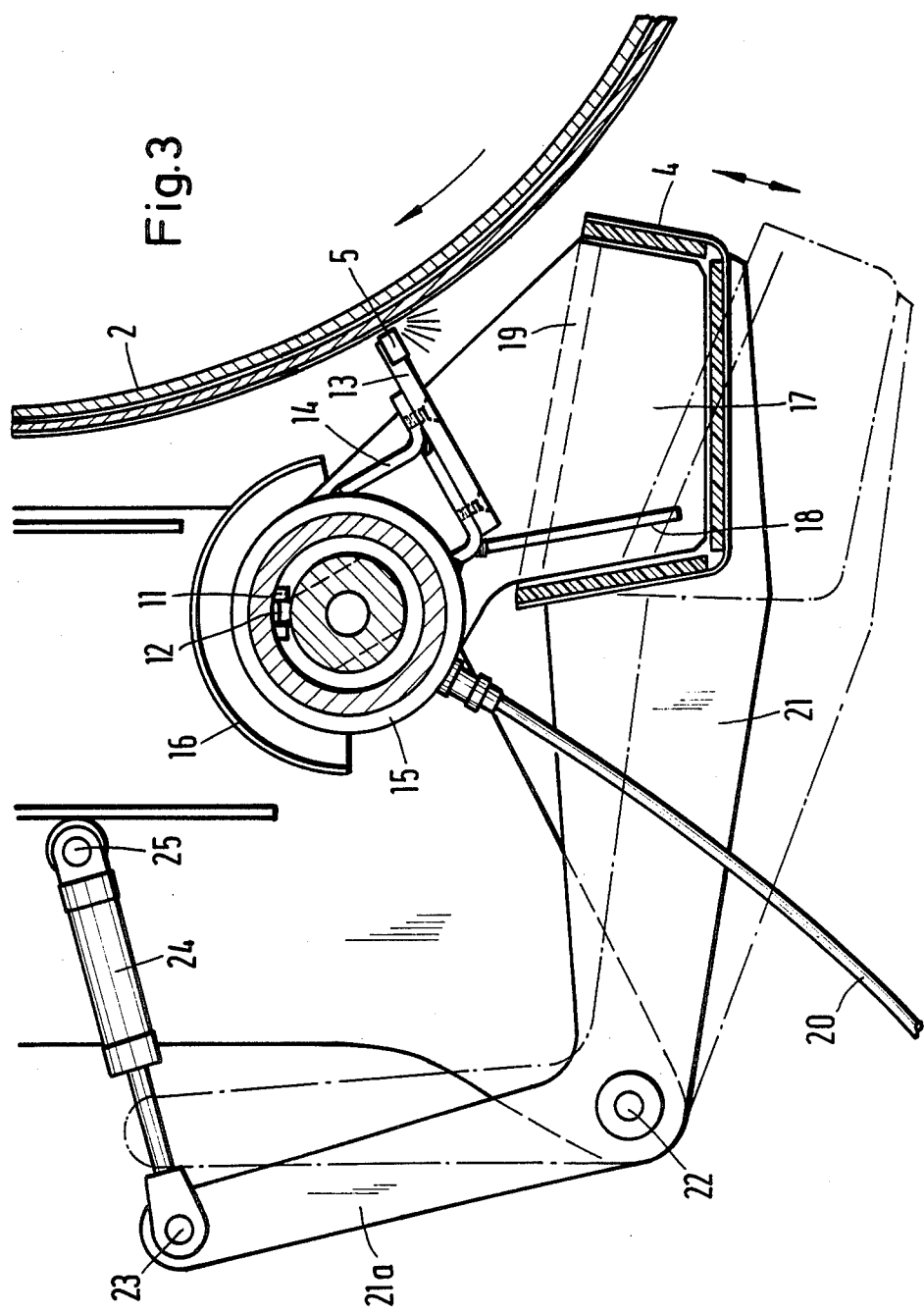

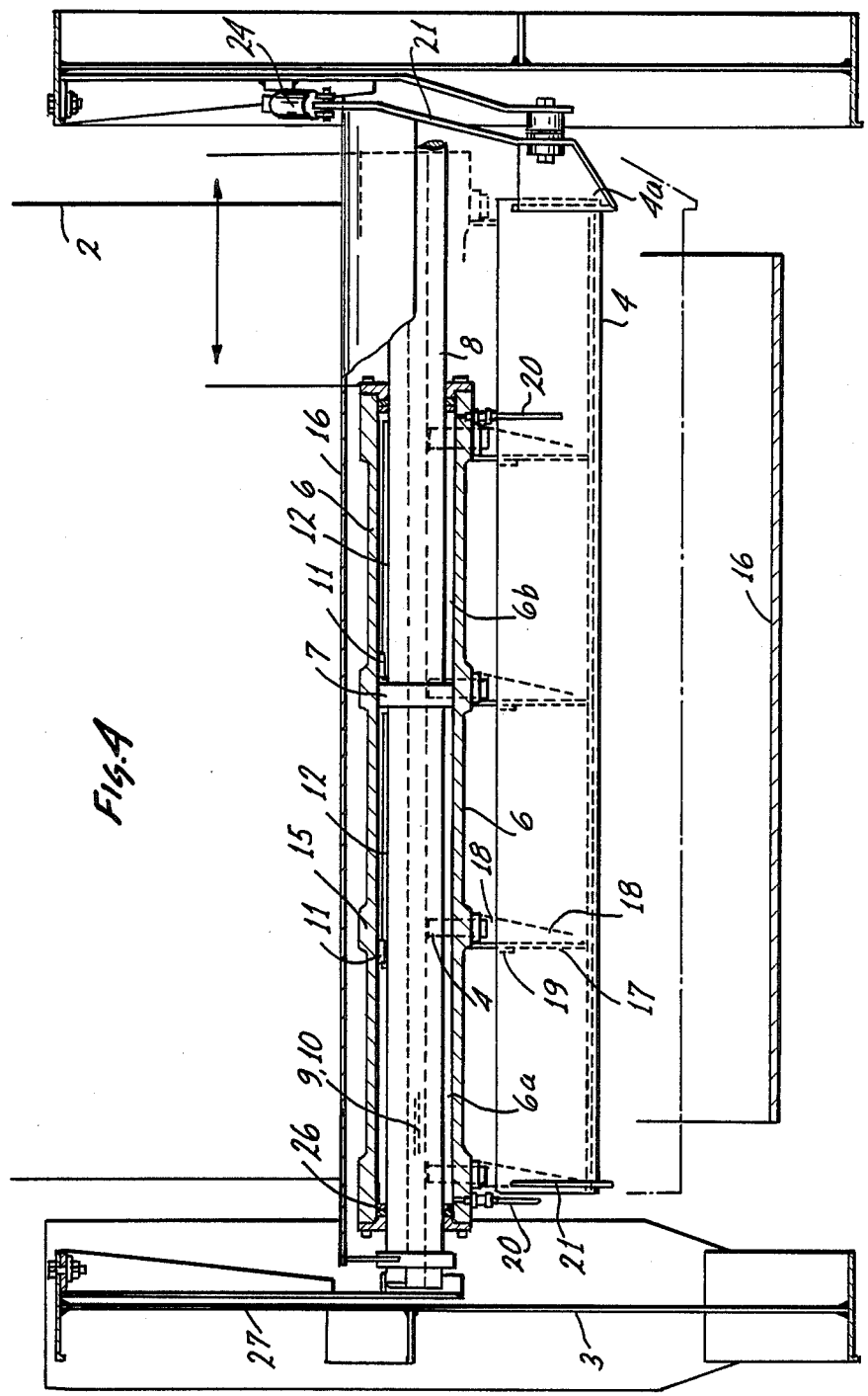

CLEANING OF A DRUM

BACKGROUND OF THE INVENTION

The present invention relates to a device for cleaning a drum while serving as a deflection device for a belt in a conveyor provided for transporting pourable goods. Basically a drum of the type to which the invention pertains is disclosed in German Patent No. 503,488. This patent discloses a drum and a conveyor belt; near the end of the conveyor at a location where the transported good pour off, two additional drums are situated next to the conveyor drum and one of which is provided with a stripping device for removing dirt. The stripped off dirt drops on to the conveyor belt and is thrown off the belt at the location of the second, driven rear end deflection drum of the conveyor. In this arrangement any dirt which has lodges during transportation on the upper stringer of the belt will be placed onto the lower stringer and will therefore reach the above mentioned driven drum causing significant soiling thereof. This in turn means that a fairly large amount of dirt has to be removed immediately. Another disadvantage is the fact that the additional drums actually lead to an unnecessary large vertical dimension of the conveyer particularly of the support structure near the throw-off point because even the lower one of the additional drums have to be situated above the point of throw-off.

DESCRIPTION OF THE INVENTION

It is an object of the present invention to provide a new and improved drum cleaning device to be arranged at a location in which it will not interfer with the overall operation and without requiring additional drums so that the overall vertical dimensions of the system including frame and mounting structure containing the drum can remain lower than was heretofore possible.

In accordance with the preferred embodiment of the present invention, it is suggested to provide a soil stripper between the upper conveyer stringer and the return stringer, to bear against the reversing drum and that underenath the stripper a trough or the like is provided for receiving stripped off dirt. In this kind of arrangement therefore only that the surface portion of the conveyer belt engages the drum which faces away always from the pourable goods and offers therefore only little soiled surface areas. Accordingly only small amounts of dirt have to be removed. The drum cleaner including the dirt catching trough is situated between upper and lower stringers and does not require any additional vertical dimensions as far as construction is concerned.

In furtherance of the invention several strippers are arranged in spaced apart relationship and arranged parallel to the drum. These strippers pertain to a shifting unit constructed e.g. as an hydraulic cylinder drive or as a pneumatic device or as an electrically operating device whereby basically a piston rod is provided across the entire width of the rum and is fastened with its end to adjustable holders. In the case of a hydraulic or pneumatic operation this rod has a piston in about its middle so that two cylinder chambers are established. In order to shift the cylinder in relation to the piston the two cylinder chambers are alternatingly pressurized and cause therefore to move the cylinder in a back and forth or reciprocating fashion.

The strippers are fastened to the drum and extend over just a portion of the entire length of the drum due to the reciprocating motion, the remaining portion of the drum will also be cleaned. The value of the cylinder speed must be smaller than the calculated strip width covered per drum revolution. In order to avoid rotation of the cylinder about the piston rod a lock against rotation is provided constructed of a combination of rails and keys. The rails and keys engage each other for a length larger than the stroke of the cylinder, so that rotation is prevented even if the cylinder and the portion rod move axially in relation to each other.

In furtherance of the invention dirt pushing plates are provided at the hydraulic cylinder, reaching into the trough and being separated from each other approximately by one quarter length of the drum. The trough is provided for pivoting and fold down operation and contains strippers for removing dirt from the sliding plates when in abutment. Thus stopping is obtained when the plates are in one of two terminal or end positions. The plate cleaning is actually carried out as the trough folds down when in this end position. Pivoting of the trough is provided in that the trough is fastened on both of its ends to one arm each of two, two arm actuating levers being pivotally mounted to a stationary part of the overall system and having the respective other arms connected to adjusting drives. In cases the drum cleaner has to work at very low temperatures, and it may be advisable to provide for heating. A longitudinal bore is provided in the piston rod for receiving a heating rod. In accordance with another feature a cover or hood is provided protecting the rod and the cylinder against the dirt that may other wise drop on them.

DESCRIPTION OF THE INVENTION

While the specification concludes with claims particularly pointing out and distinctly claiming the subject matter which is regarded as the invention, it is believed that the invention, the objects and features of the invention and further objects, features and advantages thereof will be better understood from the following description taken in connection with its accompanying drawings in which:

FIG. 3 shows a portion of the device shown in FIG. 1 but on an enlarged scale to illustrate further details therein; and FIG. 4 shows a portion of the device shown in FIG. 2 but on an enlarged scale to illustrate further details therein.

Figure 2:
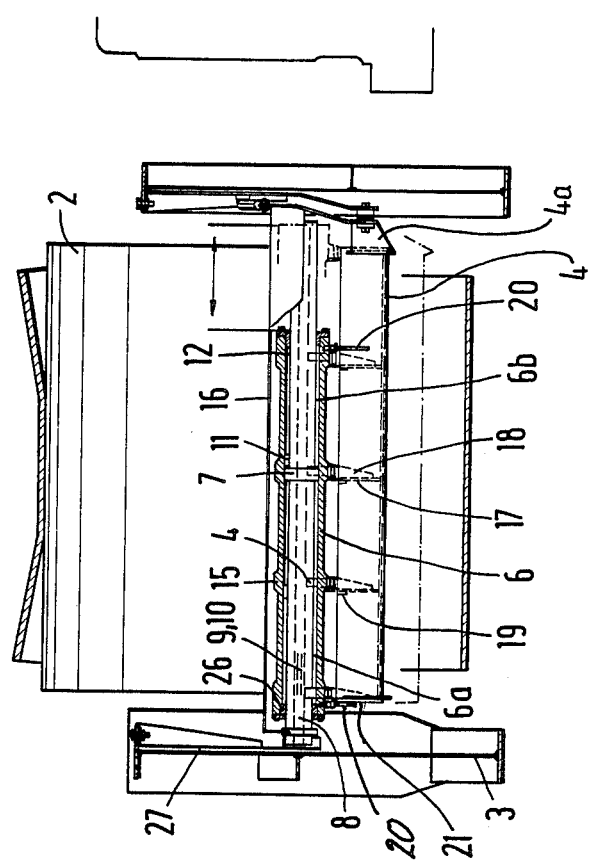
FIG. 2 is a longitudinal section view through the device shown in FIG. 1.

Proceeding now to the detailed description of the drawings the figures show conveyor belt 1 looped around the deflection drum 2. The drum is journaled in a general mounting and carrying frame or support structure 3. One can distinguish in any instance the upper stringer 1a from the lower stringer 1b. The cleaning device for the drum 2 is basically situated in the inside space between upper and lower belt stringers, adjacent to the drum 2 and facing that part of the drum which is fee from the belt 1.

Figure 1:
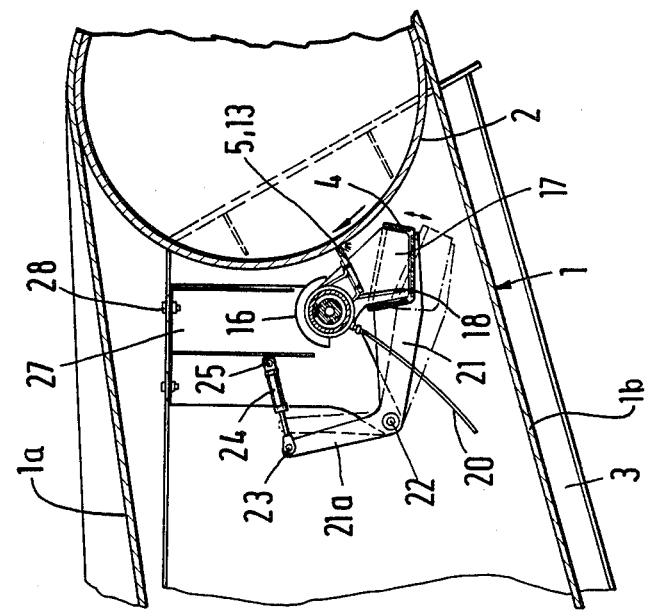
FIG. 1 is a cross section through a drum with looped around conveyor belt and including a drum cleaner in accordance with the preferred embodiment of the present invention for practicing the best mode thereof.

A plurality of soil or dirt strippers 5 are provided bearing against the drum 2 and being situated above dirt catching trough 4. The dirt will drop into the trough 4 if the trough is in the folded up position with horizontally extending bottom as illustraated in FIG. 1 and FIG. 3 in solid lines. The strippers 5 are secured to a slide element being in this case constructed as a hydraulic cylinder 6. This cylinder 6 can slide upon a piston rod 8 in axial direction and parallel to the axis of drum 2. The piston rod 8 has its ends held by mounting brackets or the like, i.e. mounting devices 27 pertaining to the overall frame and carrier structure 3. The rod 8 is provided in its center with a piston 7. In addition the rod 8 is traversed by a longitudinal bore 9 for receiving a heating rod 10. This heating device is necessary only if it is expected that the device operates at a very low ambient temperatures.

The cylinder 6 is provided with two cylinder chambers 6a and 6b separated by the piston 7 and respectively extending to both sides thereof. These chambers 6a and 6b are connected to conduits 20 which are pressurized. Glide seals 26 are provided to seal the chambesr 6a and 6b in relation to the traversing piston rod 8.

The cylinder 6 carries four strippers 5 of which two are connected to the ends of the cylinder 6 while the others are equidistantly spaced in between. The four strippers 5 each are only a few cm wide, and together they cover approximately 75% of the axial length of the drum 2. In order to cover the remaining 25% of the drums' axial length, cylinder 6 will be moved and reciprocated for this amount on piston rod 8.

The hydraulic cylinder 6 should not rotate about the piston rod. Accordingly a lock is provided preventing such rotation. This lock is comprised of two parallel glide pieces or rails 11, fastened on the inside of the hydraulic cylinder 6. Glide rails or keys 12 of the piston rod are run between these rails 11. The keys 12 extend from piston 7 over about half of the length of the piston rod 8. This arrangement suffices to prevent turning of the hydraulic cylinder 6 during its reciprocating motion on the rod 8. The circularly round annular sealing surfaces between the piston rod and the hydraulic cylinder are not affected by this lock against rotation.

The strippers 5 are fastened by means of holders 13 and angle pieces 14, to reinforcing rings 15 of the hydraulic cylinder 6. In addition a cover or hood 16 extends over the entire length of the piston rod 8 preventing soiling through the drop-off of dirt from anywhere within the system.

Dirt pushing plates 17 are also fastened to the cylinder 6 through reinforcing rings 15 and they reach into he trough 4. These plates 17 are prevented against bending by means of stiffening rods or bars 18. Dirt stripped off the drum 2 by the strippers 5 falls into the trough 4 and from there the dirt is removed through lateral shifting of the strippers 5 as well as of the plates 17 connected therewith, relative to trough 4. The shifting occurs over a stroke length of the hydraulic cylinder. The dirt pushing or removing plates 17 will be moved during this operation against the plate strippers 19 being fastened to and across the opening of the trough 4. The trough 4 can be lowered i.e. pivoted whereupon its strippers 19 strip any dirt off the plates 17 and permit such dirt to fall into the trough.

In order to fold down and pivot the trough 4 e.g. during a return stroke of the hydraulic cylinder 6, the trough 4 is mounted on both sides to pivot levers 21. These levers are two arm levers and they have a pivot point established by journal pins 22 by means of which the levers are journaled for pivoting on the holder 27. The respective upper arm 21a of the two arms levers 21 are connected to piston rods of hydraulic piston cylinder units such as 24; the connection is an articulated or pivotal one using a connecting pin 23 in each instance. The cylinder itself is connected through another articulation 25 to holding structure 27. The holding structure 27 also carries the cleaner device as described. For reasons of accurate adjustment the holding structures 27 are provided with a plurality of oblong slots through which the holders are connected by means of bolts 28 to the overall carrier frame 3.

After the hydraulic cylinder 6 has been retracted the trough 4 will be lifted again until trough bottom reaches the dirt shifting plates 17 and during the next cylinder stroke these plates will agains move dirt to the end of the trough, and from there the dirt will drop off to a removal facility 4a.

The oscillating movement of the hydraulic cylinder 6 as well as the motion and the pivot motion of the trough 4 are hydraulically synchronized to each other. The hydraulic control unit will for this purpose be positioned outside of the soiling area and the conduits 20 are provided for connecting the various hydraulic elements in the device to that external control unit.

The invention is not limited to the embodiments described above but all changes and modifications thereof, not constituting departures from the spirit and scope of the invention, are intended to be included.

We claim:

1. In a device for transporting pourable goods and including a conveyor belt looped around a drum establishing accordingly an upper and a lower stringer, a cleaning device for the drum comprising:
   at least one stripper disposed between upper and lower stringer of the belt and abutting the rotating drum;
   a pivotable trough for receiving stripped off dirt and arranged underneath said stripper or strippers;
   a plurality of dirt pushing plates reachign into said trough, said trough being provided for downward pivoting while said dirt pushing plates remain in position; and
   stripping means for engagement of the dirt pushing plates to strip dirt off said plates as the trough pivots down.

2. The device as in claim 1 there being a plurality of strippers spaced apart along the extension of the drum, said strippers being mounted to an axially displaceable unit for reciprocating along a periphery and parallel to an axial direction of the drum.

3. The device as in claim 2 and including a stationary piston rod that extends over the entire length of the drum and being fastened to stationary structure of the device; further including a hydraulic cylinder reciprocatingly mounted on said piston rod, there being hydraulic means for causing said hydraulic cylinder to reciprocate, said strippers being fastened to said hydraulic cylinder.

4. The device as in claim 3 and including means for preventing rotation of said hydraulic cylinder.

5. The device as in claim 4 said means for preventing rotation including rail and key means remaining operative during reciprocating motion of the cylinder.

6. The device as in claim 3 said piston rod having a bore there being a heating rod mounted in said rod.

7. Device as in claim 3 said piston and hydraulic cylinder being covered by a hood.

8. Cleaning device for a drum partially looped around by a conveyor belt establishing upper and lower stringers the cleaning device being arranged in between the upper and lower stringers and comprising:

a plurality of strippers disposed in abutting relation to said drum;

a hydraulic cylinder for mounting said strippers, a stationary piston rod disposed for mounting said hydraulic cylinder, and carrying a piston, said hydraulic cylinder reciprocating on said piston and piston rod;

a plurality of downwardly extending soil, laterally movable shifting plates mounted on said cylinder and moving therwith;

a dirt catching trough pivotally mounted underneath said cylinder there being means for pivoting said trough; and including stripping bars extending across an open surface of the trough and being in engagement with said soil pushing plates for cleaning said plates upon pivoting of the trough.

* * * * *